(12) United States Patent
Horie et al.

(10) Patent No.: US 10,495,330 B2
(45) Date of Patent: Dec. 3, 2019

(54) AIR CONDITIONING SYSTEM

(71) Applicant: Mitsubishi Electric Corporation, Tokyo (JP)

(72) Inventors: Hayato Horie, Tokyo (JP); Mamoru Hamada, Tokyo (JP); Masaki Toyoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

(21) Appl. No.: 15/750,571

(22) PCT Filed: Aug. 20, 2015

(86) PCT No.: PCT/JP2015/073307
§ 371 (c)(1),
(2) Date: Feb. 6, 2018

(87) PCT Pub. No.: WO2017/029741
PCT Pub. Date: Feb. 23, 2017

(65) Prior Publication Data
US 2019/0011137 A1  Jan. 10, 2019

(51) Int. Cl.
*F24F 3/147* (2006.01)
*F24F 3/153* (2006.01)
(Continued)

(52) U.S. Cl.
CPC ............. *F24F 3/153* (2013.01); *F24F 11/77* (2018.01); *F24F 2140/50* (2018.01)

(58) Field of Classification Search
CPC ............. F24F 1/0087; F24F 3/14; F25B 7/00
(Continued)

(56) References Cited

U.S. PATENT DOCUMENTS 2,135,300 A * 11/1938 Crago .............. F24F 3/14
165/265
2,257,915 A * 10/1941 Newton ............ F24F 3/14
165/228
(Continued)

FOREIGN PATENT DOCUMENTS

JP   H06-337151 A   12/1994
JP   H09-329371 A   12/1997
(Continued)

OTHER PUBLICATIONS

International Search Report of the International Searching Authority dated Nov. 24, 2015 for the corresponding International application No. PCT/JP2015/073307 (and English translation).

*Primary Examiner* — Allen J Flanigan
(74) *Attorney, Agent, or Firm* — Posz Law Group, PLC

(57) ABSTRACT

An air conditioning system includes a compressor to compress refrigerant; a first heat exchanger to condense the compressed refrigerant into a supercooled liquid state; a first decompressor to decompress the condensed refrigerant; a second heat exchanger to cause the decompressed refrigerant to absorb heat; a second decompressor to decompress the heated refrigerant; a third heat exchanger to evaporate the decompressed refrigerant; and a blower fan to take in air from outside a room and blow the air to the first heat exchanger. The second heat exchanger is disposed downstream of the first heat exchanger in a blowing direction of the blower fan. A humidifier is disposed between the first heat exchanger and the second heat exchanger in the blowing direction. The air blown from the blower fan is heated by the first heat exchanger, humidified by the humidifier, cooled by the second heat exchanger, and supplied into the room.

14 Claims, 9 Drawing Sheets

(51) Int. Cl.
*F24F 11/77* (2018.01)
*F24F 140/50* (2018.01)

(58) Field of Classification Search
USPC .......................................................... 62/176
See application file for complete search history.

(56) References Cited

U.S. PATENT DOCUMENTS

| | | | |
|---|---|---|---|
| 5,950,442 A | | 9/1999 | Maeda et al. |
| 2011/0016896 A1* | | 1/2011 | Oomura ............. B60H 1/00785 62/155 |
| 2017/0292740 A1* | | 10/2017 | Jeong ........................ F25B 9/08 |

FOREIGN PATENT DOCUMENTS

| | | |
|---|---|---|
| JP | H10-205816 A | 8/1998 |
| JP | 2008-292063 A | 12/2008 |
| JP | 4651460 B2 | 12/2010 |
| JP | 2011-208891 A | 10/2011 |
| JP | 2013-228153 A | 11/2013 |

\* cited by examiner

AIR CONDITIONING SYSTEM

CROSS REFERENCE TO RELATED APPLICATION

This application is a U.S. national stage application of International Patent Application No. PCT/JP2015/073307 filed on Aug. 20, 2015, the disclosure of which is incorporated herein by reference.

TECHNICAL FIELD

The present invention relates to an air conditioning system having a function of taking in air outside a room and supplying the air into the room.

BACKGROUND ART

Conventionally, there is known an air conditioning system including an outside air processing unit that takes in and humidifies air outside a room and supplies the air into the room. In such an air conditioning system, the humidification raises the temperature of the blown out air, leading to reduction in comfort in the room and increase in a cooling load.

Thus, to make it possible to arbitrarily control the temperature of the blown out air, there is proposed a system that includes two independent refrigeration cycles including respective heat exchangers disposed in a common air duct, and that causes each refrigeration cycle to individually perform cooling and heating operations (see, for example, Patent Literature 1).

PATENT LITERATURE

Patent Literature 1: Japanese Patent Application Publication No. 2008-292063 (FIG. 3 and paragraph 0012)

However, when two refrigeration cycles are provided as described above, power consumption increases. Moreover, since it is necessary to individually control the two refrigeration cycles, the system configuration and control are complicated, leading to increase in equipment cost.

SUMMARY

The present invention has been made to solve the above problems, and is intended to provide an air conditioning system capable of regulating the temperature of blown out air within a desired range, while reducing increase in power consumption and preventing the configuration and control from being complicated.

To solve the above problem, an air conditioning system of the present invention includes a refrigerant circuit including a compressor, a condenser, a first decompressor, a heat exchanger, a second decompressor, and an evaporator that are connected so as to allow refrigerant to circulate therethrough; and a blower fan to take in air from outside a room and blow the air to the condenser. The heat exchanger is disposed downstream of the condenser in a blowing direction of the blower fan. A humidifier is disposed between the condenser and the heat exchanger in the blowing direction of the blower fan. The refrigerant discharged from the compressor is condensed into a supercooled liquid state in the condenser, decompressed by the first decompressor, caused to absorb heat in the heat exchanger, decompressed by the second decompressor, and evaporated in the evaporator. The air blown from the blower fan is heated by the condenser, humidified by the humidifier, cooled by the heat exchanger, and supplied into the room.

The air conditioning system of the present invention cools air in the heat exchanger and then supplies the air in the room. This makes it possible to reduce an increase in temperature of the blown out air during the humidifying operation in winter, for example, and reduce both reduction in comfort in the room and increase in a cooling load. Moreover, since the air conditioning system includes a single refrigerant circuit, it can have a simple configuration and requires no complicated control.

DETAILED DESCRIPTION

First Embodiment

<Configuration>

Figure 1:
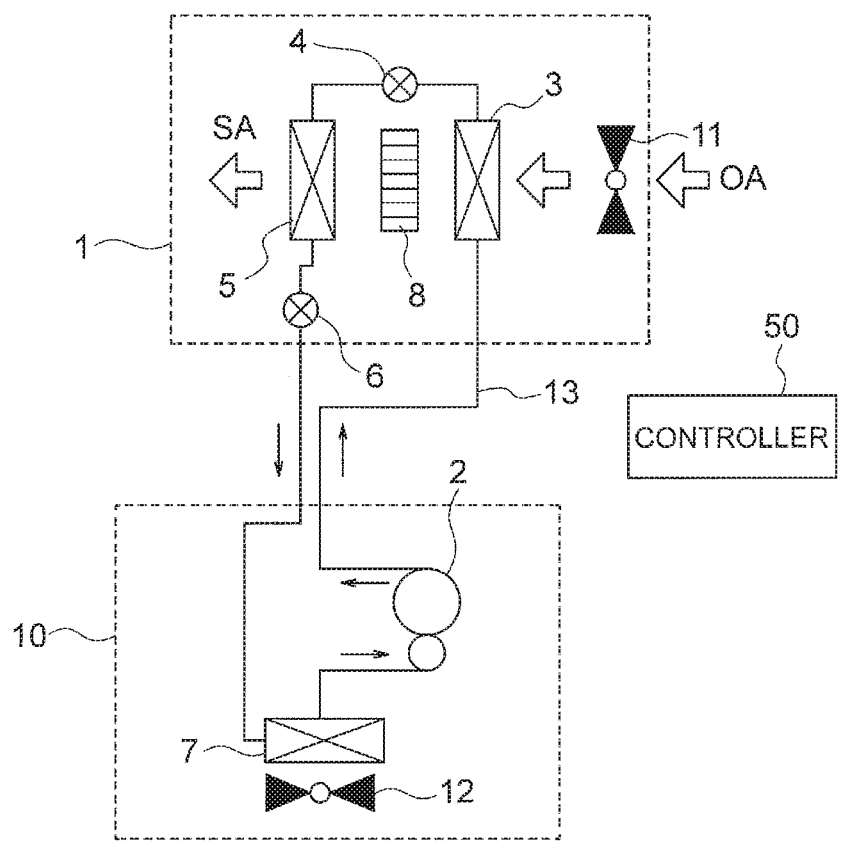
FIG. 1 is a diagram illustrating a configuration of an air conditioning system according to a first embodiment of the present invention.

FIG. 1 is a diagram illustrating a configuration of an air conditioning system 100 according to a first embodiment of the present invention. The air conditioning system 100 takes in air outside a room and humidifies it, and supplies the humidified air into the room. The air conditioning system 100 includes an outside air processing unit 1, an outdoor unit 10, and a controller 50. The outside air processing unit 1 and outdoor unit 10 are connected to each other through refrigerant piping 13.

The outside air processing unit 1 includes a first heat exchanger 3 as a condenser, a first decompressor 4, a second heat exchanger 5 as a heat exchanger, and a second decompressor 6. The first heat exchanger 3 and second heat exchanger 5 are disposed to face each other. A humidifier 8 is disposed between the first heat exchanger 3 and the second heat exchanger 5.

An indoor blower fan 11 as a blower fan that takes in air from outside the room is disposed on a side of the first heat exchanger 3 opposite to the second heat exchanger 5. The first heat exchanger 3, humidifier 8, and second heat exchanger 5 are arranged in this order in a blowing direction of the indoor blower fan 11, in an air path of the indoor blower fan 11.

The outdoor unit 10 includes a compressor 2 and an outdoor heat exchanger (third heat exchanger) 7 as an evaporator. An outdoor blower fan 12 is disposed to face the outdoor heat exchanger 7.

The compressor 2, first heat exchanger 3, first decompressor 4, second heat exchanger 5, second decompressor 6, and outdoor heat exchanger 7 are connected in series by the refrigerant piping 13 so that refrigerant circulates therethrough in this order, and constitute a refrigerant circuit.

The compressor 2 sucks and compresses the refrigerant into high-temperature and high-pressure gas refrigerant, and discharges it. The compressor 2 is equipped with an inverter, for example. The controller 50 controls an operational frequency (rotational frequency) of the compressor 2, thereby controlling a capacity (the amount of refrigerant discharged per unit time) of the compressor 2.

The first heat exchanger 3 operates as a condenser, and exchanges heat between the refrigerant discharged from the compressor 2 and the air outside the room taken in by the indoor blower fan 11, thereby condensing the refrigerant.

The first decompressor 4, which is, for example, an expansion valve, decompresses the refrigerant delivered from the first heat exchanger 3. The controller 50 controls the first decompressor 4 (e.g., the degree of opening of the expansion valve), thereby controlling the amount of decompression of the refrigerant.

The second heat exchanger 5 exchanges heat between the refrigerant delivered from the first decompressor 4 and the air blown by the indoor blower fan 11 (the air that has passed through the first heat exchanger 3 and humidifier 8) and causes the refrigerant to absorb heat, thereby changing the refrigerant from a supercooled liquid state to a saturated liquid state.

The second decompressor 6, which is, for example, an expansion valve, decompresses the refrigerant delivered from the second heat exchanger 5. The controller 50 controls the second decompressor 6 (e.g., the degree of opening of the expansion valve), thereby controlling the amount of decompression of the refrigerant.

The outdoor heat exchanger 7 operates as an evaporator, and exchanges heat between the refrigerant delivered from the second decompressor 6 and air outside the room, thereby evaporating the refrigerant.

The indoor blower fan 11 takes in air outside the room, causes the air to pass through the first heat exchanger 3, humidifier 8, and second heat exchanger 5, and supplies the air into the room. The humidifier 8 humidifies the air blown by the indoor blower fan 11. The humidifying method of the humidifier 8 may be a vaporization method or a spray method. The outdoor blower fan 12 exhausts the air that has exchanged (absorbed) heat in the outdoor heat exchanger 7 to the outside of the room.

The controller 50 receives a detection value of the temperature of the blown out air detected by a temperature sensor provided in the room. The controller 50 controls the capacity (operational frequency) of the compressor 2, the amount of decompression by the first decompressor 4, and the amount of air blown by the indoor blower fan 11, on the basis of the difference between a target value (user set value) of the temperature of the blown out air and the detection value, thereby controlling the amount of condensation heat in the first heat exchanger 3 and the amount of heat exchanged in the second heat exchanger 5.

The controller 50 also controls the amount of water supplied to the humidifier 8 (e.g., the degree of opening of a flow control valve provided in a water channel for the humidifier 8) on the basis of, for example, the difference between humidity in the room detected by a humidity sensor or the like and humidity set by a user, thereby controlling the amount of humidification by the humidifier 8.

The air conditioning system 100 of the first embodiment is configured to perform only the humidifying operation. A configuration for performing both the humidifying operation and the dehumidifying operation will be described in a second embodiment.

<Operation>

Figure 2:
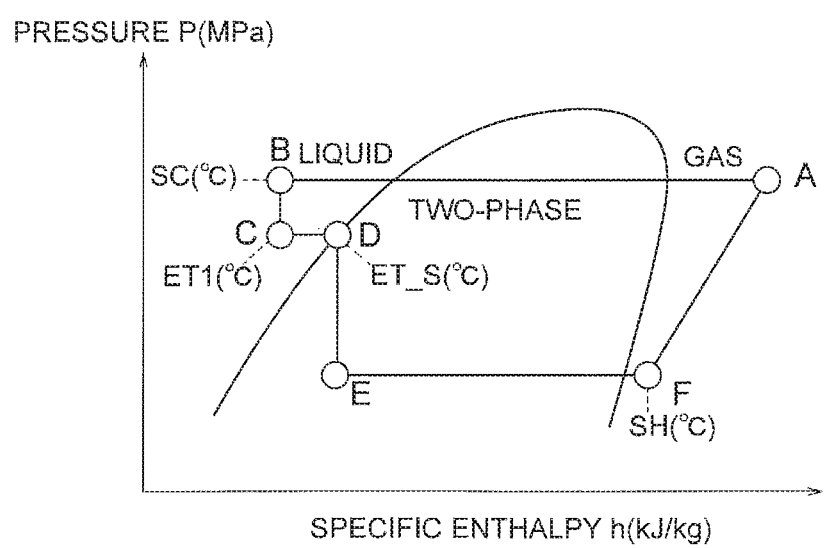
FIG. 2 is a p-h diagram during a humidifying operation of the air conditioning system according to the first embodiment of the present invention.

The operation of the air conditioning system 100 of the first embodiment will now be described by following the flow of the refrigerant. FIG. 2 is a p-h diagram (pressure-specific enthalpy diagram) in the first embodiment. In FIG. 2, the vertical axis represents pressure (MPa), and the horizontal axis represents specific enthalpy (kJ/kg).

The high-temperature and high-pressure gaseous refrigerant (point A in FIG. 2) compressed by the compressor 2 of the outdoor unit 10 flows into the first heat exchanger 3 of the outside air processing unit 1. The first heat exchanger 3 operates as a condenser, and the refrigerant exchanges heat with air taken in from outside the room by the indoor blower fan 11, thereby releasing heat and condensing into liquid single-phase refrigerant (point B in FIG. 2). The refrigerant at this time is in a supercooled liquid state. The temperature of the refrigerant at this time is indicated by reference character SC in FIG. 2. The refrigerant condensed in the first heat exchanger 3 flows into the first decompressor 4. The refrigerant is decompressed in the first decompressor 4 (point C in FIG. 2). The temperature of the refrigerant at this time is indicated by reference character ET1 in FIG. 2.

The refrigerant decompressed by the first decompressor 4 flows into the second heat exchanger 5. In the second heat exchanger 5, the refrigerant exchanges heat with air (air that has been heated in the first heat exchanger 3 and humidified by the humidifier 8), thereby absorbing heat and entering a saturated liquid state (point D in FIG. 2). The temperature of the refrigerant at this time is indicated by reference character ET_S in FIG. 2.

The refrigerant in the saturated liquid state flowing out of the second heat exchanger 5 flows into the second decompressor 6. In the second decompressor 6, the refrigerant is decompressed into low-temperature and low-pressure two-phase refrigerant (point E in FIG. 2). The low-temperature and low-pressure two-phase refrigerant flowing out of the second decompressor 6 flows into the outdoor heat exchanger 7. The outdoor heat exchanger 7 operates as an evaporator, and the refrigerant exchanges heat with air outside the room, thereby evaporating (point F in FIG. 2). The temperature of the refrigerant at this time is indicated by reference character SH in FIG. 2. The refrigerant evaporated in the outdoor heat exchanger 7 returns to the compressor 2.

Figure 3:
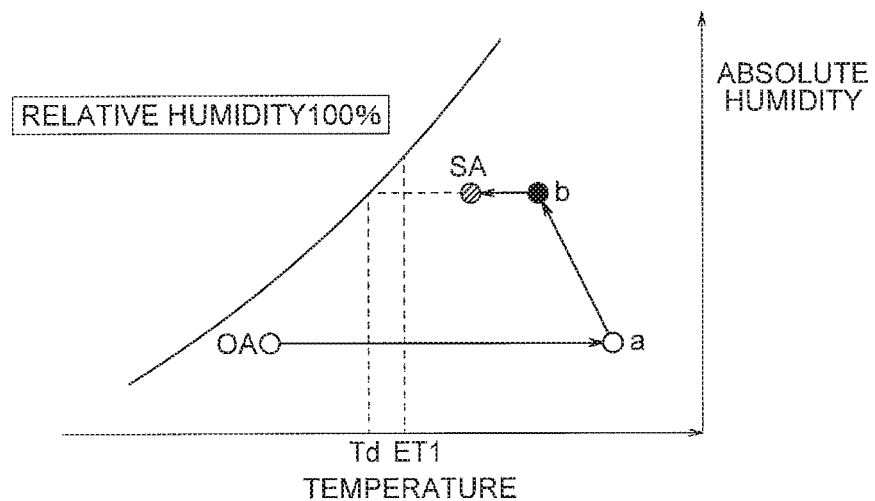
FIG. 3 is a psychrometric chart during the humidifying operation of the air conditioning system according to the first embodiment of the present invention.

The airflow will now be described. FIG. 3 is a psychrometric chart of the air conditioning system 100 of the first embodiment. In FIG. 3, the vertical axis represents absolute humidity, and the horizontal axis represents temperature (dry-bulb temperature). First, air (outdoor air OA) outside the room is taken in and blown to the first heat exchanger 3, by the indoor blower fan 11 of the outside air processing unit 1. The air blown to the first heat exchanger 3 is heated by condensation heat of the refrigerant in the first heat exchanger 3 and increases in temperature (point a in FIG. 3).

The air heated in the first heat exchanger 3 is blown to the humidifier 8, which is located downstream of the first heat exchanger 3 in the blowing direction of the indoor blower fan 11. The humidifier 8 increases the humidity of the air and decreases the temperature of the air (point b in FIG. 3).

The air passing through the humidifier 8 is blown to the second heat exchanger 5, which is located downstream of the humidifier 8 in the blowing direction of the indoor blower fan 11. In the second heat exchanger 5, the refrigerant absorbs heat while changing from supercooled liquid to saturated liquid, and thus the air is cooled and decreases in temperature. The air that has passed through the second heat exchanger 5 and had its temperature decreased is then supplied into the room as blown out air (room supply air) SA (point SA in FIG. 3).

The controller 50 controls the amount of condensation heat in the first heat exchanger 3 by controlling the amount of air blown by the indoor blower fan 11 and the capacity of the compressor 2. The controller 50 also controls the amount of humidification in the humidifier 8 by controlling the amount of water supplied to the humidifier 8, on the basis of a humidification load in the room.

As described above, in the second heat exchanger 5, the refrigerant changes from supercooled liquid to saturated liquid. If the temperature ET1 (point C in FIG. 2) of the refrigerant at this time is less than or equal to the dew-point temperature (temperature Td in FIG. 3) of the air that has passed through the humidifier 8, moisture in the air condenses and a dehumidification effect occurs. Thus, to prevent the dehumidification effect from occurring, the amount of decompression by the first decompressor 4 is controlled so that the temperature ET1 of the refrigerant in the second heat exchanger 5 is higher than the dew-point temperature Td of the air that has passed through the humidifier 8.

Specifically, for example, the dew-point temperature Td of the air that has passed through the humidifier 8 is detected by a dew-point temperature sensor; a piping temperature T_HEX of the second heat exchanger 5 (which is considered to be nearly equal to the temperature ET1 of the refrigerant) is detected by a temperature sensor; and the amount of decompression by the first decompressor 4 (the degree of opening of the expansion valve) is controlled so that T_HEX>Td.

In the first embodiment, the humidification amount required for humidification in the room is provided by taking in the outdoor air OA and controlling the amount of condensation heat in the first heat exchanger 3 or the amount of humidification by the humidifier 8. In addition, by controlling the temperature ET1 of the refrigerant in the second heat exchanger 5 so that it is higher than the dew-point temperature Td of the air that has passed through the humidifier 8, the air humidified by the humidifier 8 is supplied into the room after having its temperature decreased without being dehumidified.

<Advantages>

As described above, in the air conditioning system 100 of the first embodiment, the outdoor air OA taken in by the indoor blower fan 11 is heated when passing through the first heat exchanger (condenser) 3, humidified when passing through the humidifier 8, cooled when passing through the second heat exchanger 5 due to heat absorption when the refrigerant changes from supercooled liquid to saturated liquid, and supplied into the room. Thus, humidified air at an appropriate temperature is supplied into the room.

In this manner, after the outdoor air is humidified, it is decreased in temperature and then supplied into the room. This can reduce an increase in the cooling load of a room air conditioner during cooling in winter, for example. Further, since it is possible to reduce an increase in temperature of the blown out air caused by the humidifying operation, it is possible to reduce a decrease in comfort in the room.

Further, there is no need to provide two independent refrigeration cycle devices as described in Patent Literature 1, for example. This simplifies the configuration and control of the air conditioning system 100.

Further, if multiple sets of the first decompressor 4 and second heat exchanger 5 were provided in parallel, and the total flow of the refrigerant and the saturation temperature ET_S (point D in the drawing) were not changed, the flow of the refrigerant flowing into each of the second heat exchangers 5 would decrease and thus heat exchange efficiency would decrease. Thus, the points B and C in FIG. 2 would shift to the right (in a direction in which the dryness of the refrigerant increases), and the effect of decreasing the temperature of the blown out air SA would be reduced. On the other hand, in the first embodiment, since the components (compressor 2, first heat exchanger 3, first decompressor 4, second heat exchanger 5, second decompressor 6, and outdoor heat exchanger 7) of the refrigerant circuit are connected in series, it is possible to keep the dryness of the refrigerant at the inlet of the second heat exchanger 5 low, and obtain the effect of decreasing the temperature of the blown out air SA.

Further, according to the first embodiment, since the refrigerant changes from a supercooled liquid state to a saturated liquid state in the second heat exchanger 5, it is possible to decrease the temperature of the air that has passed through the humidifier 8 using the heat absorption by the refrigerant at that time.

Further, the temperature ET1 (point C in FIG. 2) of the refrigerant in the second heat exchanger 5 is higher than the dew-point temperature Td of the air that has passed through the humidifier 8. This can prevent a dehumidification effect from occurring in the second heat exchanger 5. Thus, there is no need for the humidifier 8 to perform extra humidification, and energy consumption can be reduced.

Further, since the refrigerant in the saturated liquid state is decompressed by the second decompressor 6 into two-phase refrigerant, it is possible to cause the refrigerant to further flow into the outdoor heat exchanger 7 and evaporate it by heat exchange.

Further, the controller 50 controls the amount of condensation heat in the first heat exchanger 3 by controlling at least one of the capacity (operational frequency) of the compressor 2 and the amount of air blown by the indoor blower fan 11. This makes it possible, together with the control of the humidifier 8, to provide the humidification amount required for humidification in the room.

Further, the controller 50 controls the amount of decompression in the first decompressor 4. This makes it possible to easily control the temperature ET1 of the refrigerant in the second heat exchanger 5 to be higher than the dew-point temperature Td of the air that has passed through the humidifier 8, as described above.

Second Embodiment

An air conditioning system 101 according to a second embodiment of the present invention will now be described. The above-described air conditioning system 100 of the first embodiment is configured to allow the refrigerant to circulate in one direction and perform the humidifying operation. In contrast, the air conditioning system 101 of the second embodiment is configured to be capable of switching a circulating direction of refrigerant and switching between a humidifying operation and a dehumidifying operation.

<Configuration>

Figure 4:
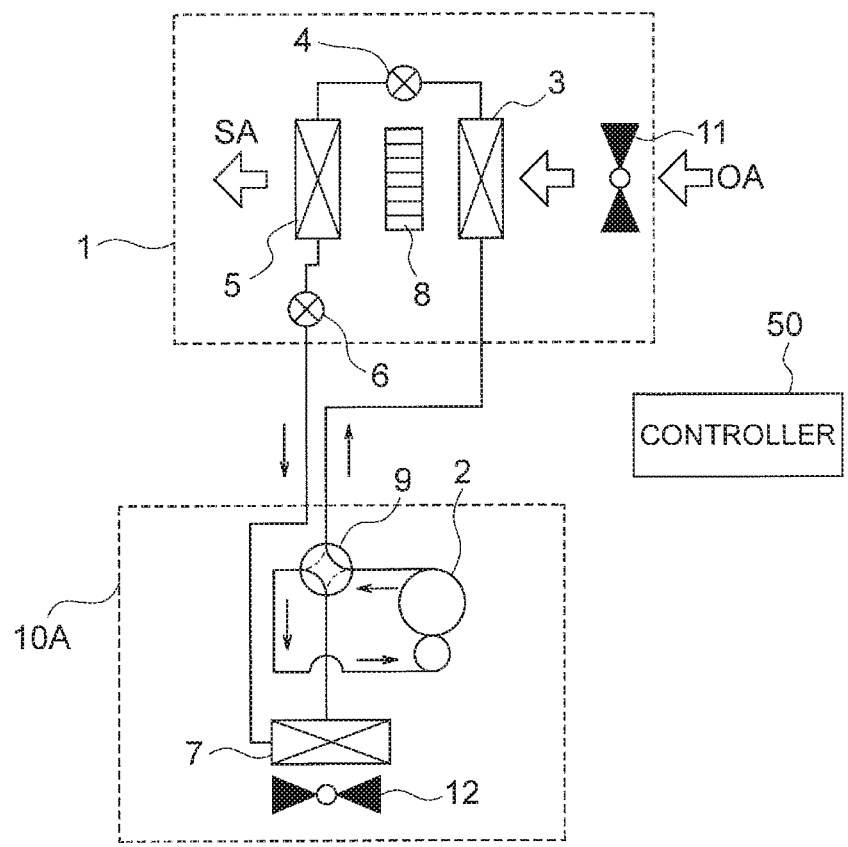
FIG. 4 is a diagram illustrating a configuration of an air conditioning system according to a second embodiment of the present invention.

A configuration of the air conditioning system 101 of the second embodiment will now be described. FIG. 4 is a diagram illustrating the configuration of the air conditioning system 101 of the second embodiment and the flow of the refrigerant during the humidifying operation. In the air conditioning system 101 of the second embodiment, a four-way valve 9 as a flow path switching valve is provided on an outlet side of a compressor 2 of an outdoor unit 10A. The four-way valve 9 switches the flow path so that the refrigerant discharged from the compressor 2 flows into a first heat exchanger 3 during the humidifying operation and into an outdoor heat exchanger 7 during the dehumidifying operation.

The first heat exchanger 3, a first decompressor 4, a second heat exchanger 5, a second decompressor 6, a humidifier 8, and an indoor blower fan 11 in an outside air processing unit 1 have the configurations described in the first embodiment. The compressor 2, the outdoor heat exchanger 7, and an outdoor blower fan 12 in the outdoor unit 10A have the configurations described in the first embodiment. A controller 50 supplies water to the humidifier 8 only during the humidifying operation and supplies no water to the humidifier 8 during the dehumidifying operation.

<Operation>

The humidifying operation of the air conditioning system 101 of the second embodiment will now be described with reference to FIG. 4. The p-h diagram of FIG. 2 described in the first embodiment will also be referred to. In the humidifying operation, the controller 50 switches the flow path by means of the four-way valve 9 so that the refrigerant discharged from the compressor 2 flows into the first heat exchanger 3, and also supplies water to the humidifier 8.

In this case, the high-temperature and high-pressure gas refrigerant (point A in FIG. 2) discharged from the compressor 2 flows into the first heat exchanger 3 through the four-way valve 9. The flow of the refrigerant flowing into the first heat exchanger 3 is the same as in the first embodiment. In the first heat exchanger (condenser) 3, the refrigerant condenses into liquid single-phase refrigerant (point B in FIG. 2).

The refrigerant condensed in the first heat exchanger 3 flows into the first decompressor 4 and is decompressed into low-temperature and low-pressure liquid single-phase refrigerant (point C in FIG. 2). The refrigerant decompressed by the first decompressor 4 flows into the second heat exchanger 5, and exchanges heat with air heated in the first heat exchanger 3, thereby absorbing heat and entering a saturated liquid state (point D in FIG. 2).

The refrigerant in the saturated liquid state flowing out of the second heat exchanger 5 flows into the second decompressor 6 and is decompressed into low-temperature and low-pressure two-phase refrigerant (point E in FIG. 2). The two-phase refrigerant flowing out of the second decompressor 6 flows into the outdoor heat exchanger (evaporator) 7, and exchanges heat with air outside the room, thereby evaporating (point F in FIG. 2). The refrigerant evaporated in the outdoor heat exchanger 7 returns to the compressor 2 through the four-way valve 9.

The airflow is the same as in the first embodiment. As illustrated in FIG. 3, outdoor air OA is taken in by the indoor blower fan 11 of the outside air processing unit 1, blown to the first heat exchanger 3, and heated by condensation heat of the refrigerant, thereby increasing in temperature (point a in FIG. 3). The air heated in the first heat exchanger 3 is blown to the humidifier 8. In the humidifier 8, the air increases in humidity and decreases in temperature (point b in FIG. 3).

The air that has passed through the humidifier 8 is blown to the second heat exchanger 5. In the second heat exchanger 5, the refrigerant absorbs heat when changing from supercooled liquid to saturated liquid, and thus the air is cooled and decreases in temperature. The air that has passed through the second heat exchanger 5 and had its temperature decreased is supplied into the room as blown out air SA (point SA in FIG. 3).

As also described in the first embodiment, the controller 50 controls the amount of condensation heat in the first heat exchanger 3 by controlling the amount of air blown by the indoor blower fan 11 and the capacity of the compressor 2. The controller 50 also controls the amount of humidification in the humidifier 8 by controlling the amount of water supplied to the humidifier 8, depending on a humidification load in the room.

The controller 50 also controls the amount of decompression by the first decompressor 4 (e.g., the degree of opening of the expansion valve) so that the temperature ET1 of the refrigerant in the second heat exchanger 5 is higher than the dew-point temperature (Td in FIG. 3) of the air that has passed through the humidifier 8.

In this manner, in the humidifying operation, the amount of humidification required for humidification in the room is provided by controlling the amount of condensation heat in the first heat exchanger 3 or the amount of water supplied to the humidifier 8. In addition, by controlling the temperature ET1 of the refrigerant in the second heat exchanger 5 so that it is higher than the dew-point temperature Td of the air that has passed through the humidifier 8, the air humidified by the humidifier 8 is supplied into the room after having its temperature decreased without being dehumidified.

Figure 5:
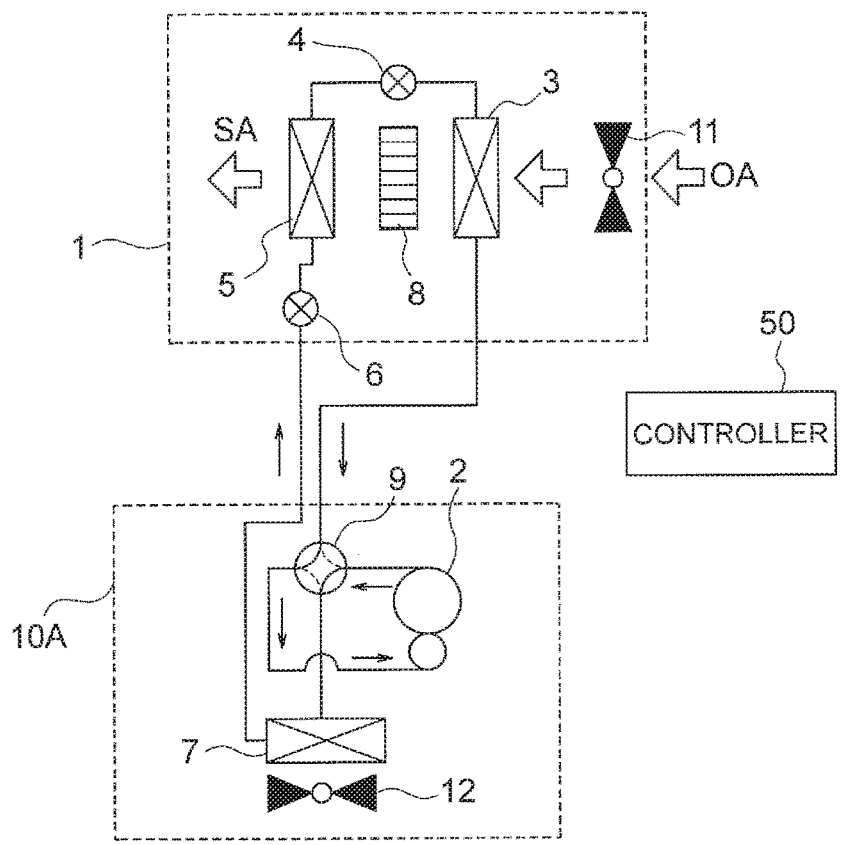
FIG. 5 is a diagram for explaining a dehumidifying operation of the air conditioning system according to the second embodiment of the present invention.
Figure 6:
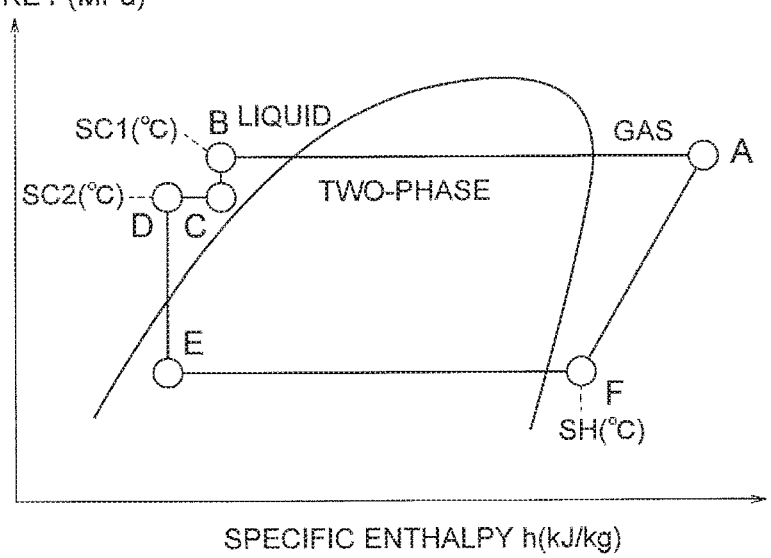
FIG. 6 is a p-h diagram during a dehumidifying operation of the air conditioning system according to the second embodiment of the present invention.

The dehumidifying operation of the air conditioning system 101 in the second embodiment will now be described with reference to FIGS. 5 and 6. FIG. 5 is a diagram illustrating the configuration of the air conditioning system 101 of the second embodiment and the flow of the refrigerant during the dehumidifying operation. FIG. 6 is a p-h diagram during the dehumidifying operation of the air conditioning system 101 of the second embodiment. In FIG. 6, the vertical axis represents a pressure (MPa), and the horizontal axis represents a specific enthalpy (kJ/kg).

In the dehumidifying operation, the controller 50 switches the flow path by means of the four-way valve 9 so that the refrigerant discharged from the compressor 2 flows into the outdoor heat exchanger 7, and also stops supply of water to the humidifier 8.

In this case, the high-temperature and high-pressure gas refrigerant (point A in FIG. 6) discharged from the compressor 2 flows into the four-way valve 9, and flows into the outdoor heat exchanger 7 through the four-way valve 9. The outdoor heat exchanger 7 operates as a condenser, and the refrigerant exchanges heat with outdoor air, thereby releasing heat and condensing into liquid single-phase refrigerant (point B in FIG. 6). The refrigerant at this time is in a supercooled liquid state. The temperature of the refrigerant at this time is indicated by reference character SC1 in FIG. 6. The refrigerant condensed in the outdoor heat exchanger 7 flows into the second decompressor 6. In the second decompressor 6, the refrigerant is decompressed (point C in FIG. 6).

The refrigerant decompressed by the second decompressor 6 flows into the second heat exchanger 5. In the second heat exchanger 5, the refrigerant exchanges heat with air (described later) that has passed through the first heat exchanger 3 and had its temperature decreased, thereby releasing heat, so that the degree of supercooling of the refrigerant increases (point D in FIG. 6). The temperature of the refrigerant at this time is indicated by reference character SC2 in FIG. 6. The refrigerant flowing out of the second decompressor 6 flows into the first decompressor 4. In the first decompressor 4, the refrigerant is decompressed into low-temperature and low-pressure two-phase refrigerant (point E in FIG. 6).

The low-temperature and low-pressure two-phase refrigerant flowing out of the first decompressor 4 flows into the first heat exchanger 3. The first heat exchanger 3 operates as an evaporator, and the refrigerant exchanges heat with air blown by the indoor blower fan 11, thereby evaporating (point F in FIG. 6). The temperature of the refrigerant at this time is indicated by reference character SH in FIG. 6. The refrigerant evaporated in the first heat exchanger 3 returns to the compressor 2.

The airflow in the dehumidifying operation will now be described. First, outdoor air OA is taken in by the indoor blower fan 11 of the outside air processing unit 1 and blown to the first heat exchanger 3. In the first heat exchanger 3, the air blown to the first heat exchanger 3 transfers evaporation heat to the refrigerant and is cooled, so that the temperature of the air decreases. With the decrease in temperature of the air, moisture contained in the air condenses and is removed through a drain or the like, and thus the humidity also decreases.

The air whose temperature has been decreased by the first heat exchanger 3 is blown to the humidifier 8. As described above, supply of water to the humidifier 8 is stopped during the dehumidifying operation, so the temperature and humidity of the air do not change.

The air that has passed through the humidifier 8 is blown to the second heat exchanger 5. In the second heat exchanger 5, the refrigerant releases heat when its degree of supercooling increases, and thus the air is heated and increases in temperature. The air that has passed through the second heat exchanger 5 and has had its temperature increased is supplied into the room.

The controller 50 controls the evaporation temperature of the refrigerant in the first heat exchanger 3 by controlling the amount of air blown by the indoor blower fan 11, the amount of decompression by the first decompressor 4, and the capacity of the compressor 2. Thereby, the amount of dehumidification can be adjusted depending on a dehumidification load in the room.

The controller 50 also controls the amount of decompression by the second decompressor 6 on the basis of a target temperature of the blown out air, thereby controlling the temperature SC2 of the supercooled refrigerant in the second heat exchanger 5. For example, when it is desired to increase the temperature of the blown out air to an appropriate temperature, the amount of decompression by the second decompressor 6 is decreased (the degree of opening of the expansion valve is increased), and conversely, when it is desired to decrease the temperature of the blown out air, the amount of decompression by the second decompressor 6 is increased (the degree of opening of the expansion valve is decreased).

In this manner, in the dehumidifying operation, the amount of dehumidification required for dehumidification in the room is obtained by controlling the evaporation temperature of the refrigerant in the first heat exchanger 3. In addition, by controlling the temperature SC2 of the supercooled refrigerant in the second heat exchanger 5 on the basis of the target temperature of the blown out air, the dehumidified air is heated to an appropriate temperature and then supplied into the room.

<Advantages>

As described above, in the air conditioning system 101 of the second embodiment, in addition to the advantages of the first embodiment described above, during the dehumidifying operation, the outdoor air OA taken in by the indoor blower fan 11 decreases in temperature and humidity when passing through the first heat exchanger (evaporator) 3, is heated when passing through the second heat exchanger 5, and is blown out into the room. Thus, dehumidified air at an appropriate temperature is supplied into the room. Thus, it is possible to prevent loss in comfort due to an excess decrease in temperature of the blown out air SA.

Further, since there is no need to increase the evaporation temperature in the first heat exchanger 3 so as to prevent the temperature of the blown out air SA from decreasing, it is possible to prevent the dehumidification amount from lacking.

Further, as in the first embodiment, since the components (compressor 2, first heat exchanger 3, first decompressor 4, second heat exchanger 5, second decompressor 6, and outdoor heat exchanger 7) of the refrigerant circuit are connected in series, it is possible to keep the dryness of the refrigerant at the inlet of the second heat exchanger 5 low, and obtain the effect of decreasing the temperature of the blown out air SA.

Third Embodiment

An air conditioning system 102 according to a third embodiment of the present invention will now be described. The air conditioning system 102 of the third embodiment is obtained by adding a total heat exchanger 20 to the outside air processing unit 1 of the above-described air conditioning system 100 (101) of the first or second embodiment.

<Configuration>

Figure 7:
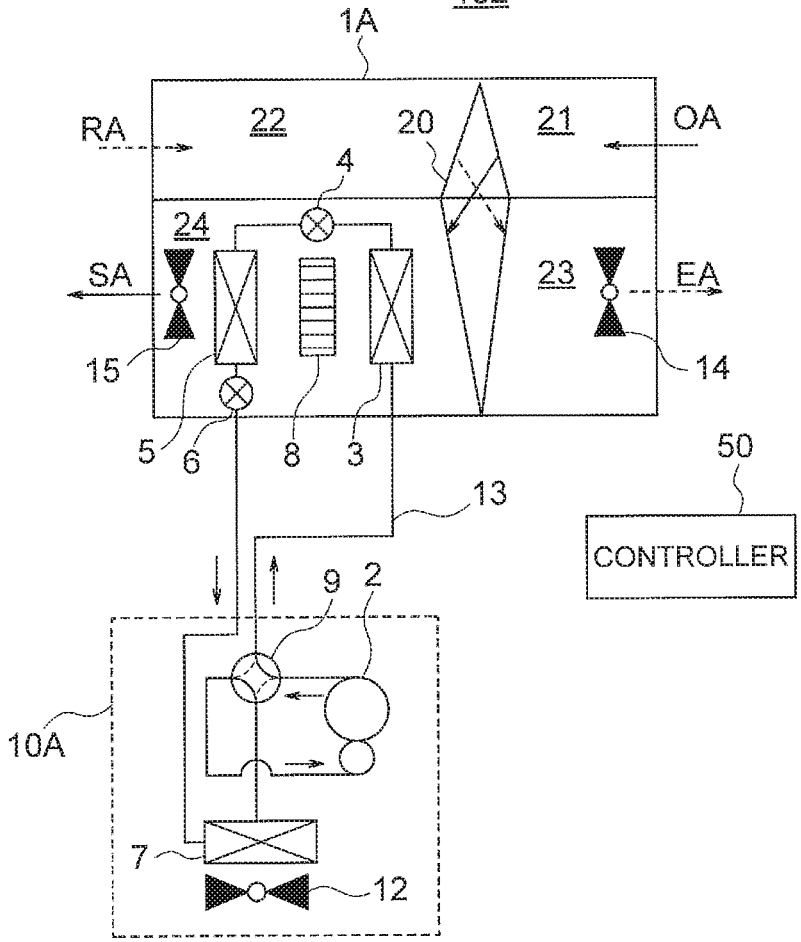
FIG. 7 is a diagram illustrating a configuration of an air conditioning system according to a third embodiment of the present invention.

FIG. 7 is a diagram illustrating a configuration of the air conditioning system 102 of the third embodiment. An outside air processing unit 1A of the air conditioning system 102 includes a first airflow path 21 for introducing outdoor air (or air outside a room) OA, a second airflow path 22 for introducing indoor air (or air inside the room) RA, the total heat exchanger 20 that exchanges heat between the outdoor air OA and the indoor air RA, a third airflow path 23 for exhausting the indoor air RA flowing out of the total heat exchanger 20, and a fourth airflow path 24 for supplying the outdoor air OA flowing out of the total heat exchanger 20 into the room.

The first airflow path 21 is disposed on an outdoor side of the total heat exchanger 20, and the second airflow path 22 is disposed on an indoor side of the total heat exchanger 20. The third airflow path 23 is disposed on the outdoor side of the total heat exchanger 20, and the fourth airflow path 24 is disposed on the indoor side of the total heat exchanger 20. An exhaust fan 14 is disposed at an outlet of the third airflow path 23, and an indoor blower fan 15 is disposed at an outlet of the fourth airflow path 24.

The first heat exchanger 3, first decompressor 4, second heat exchanger 5, second decompressor 6, and humidifier 8, which have been described in the first embodiment, are disposed in the fourth airflow path 24.

The outdoor air OA flows through the first airflow path 21 of the outside air processing unit 1A toward the total heat exchanger 20, passes through the total heat exchanger 20, and then flows into the fourth airflow path 24. Then, the air flowing into the fourth airflow path 24 passes through the first heat exchanger 3, humidifier 8, and second heat exchanger 5 in this order, and is supplied into the room as blown out air SA by the indoor blower fan 15.

The indoor air RA flows through the second airflow path 22 of the outside air processing unit 1A toward the total heat exchanger 20, passes through the total heat exchanger 20, and then flows into the third airflow path 23. Then, the air flowing into the third airflow path 23 is exhausted outside the room as exhaust air EA by the exhaust fan 14.

The refrigerant circuit is as described in the second embodiment. The compressor 2, first heat exchanger 3, first decompressor 4, second heat exchanger 5, second decompressor 6, and outdoor heat exchanger 7 are connected by the refrigerant piping 13. Here, the four-way valve 9 described in the second embodiment is provided so that the flow of the refrigerant can be switched, but the four-way valve 9 may be omitted.

<Operation>

Figure 8:
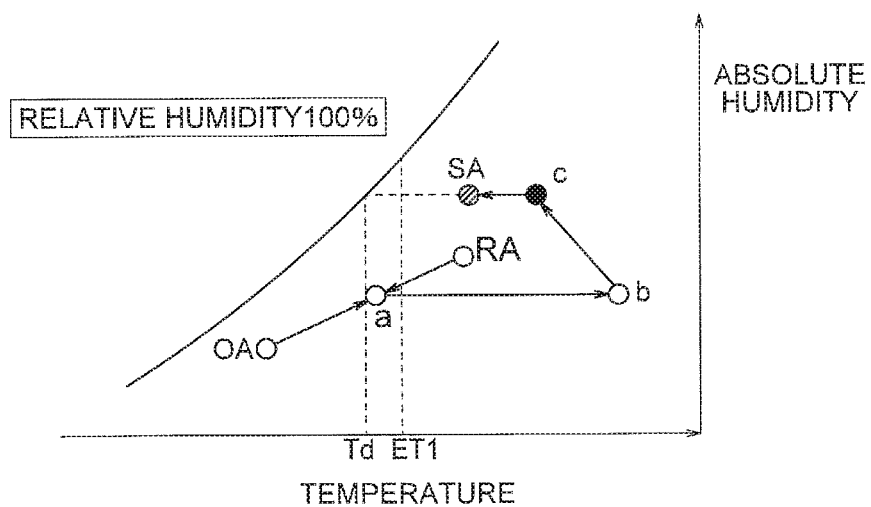
FIG. 8 is a psychrometric chart during a humidifying operation of the air conditioning system according to the third embodiment of the present invention.

The flow of the refrigerant during the humidifying operation in the third embodiment is as described in the first embodiment, so the airflow during the humidifying operation will be described. FIG. 8 is a psychrometric chart during the humidifying operation of the air conditioning system 102 of the third embodiment. With rotation of the indoor blower fan 15 of the outside air processing unit 1A, the outdoor air OA is sucked into the first airflow path 21 and flows into the total heat exchanger 20. Also, with rotation of the exhaust fan 14, the indoor air RA is sucked into the second airflow path 22 and flows into the total heat exchanger 20. In the total heat exchanger 20, heat is exchanged between the outdoor air OA and the indoor air RA. For example, in the case of the humidifying operation in winter, since the temperature and humidity of the indoor air RA are higher, the temperature and humidity of the outdoor air OA increase (point a in FIG. 8).

The outdoor air OA flowing out of the total heat exchanger 20 flows into the fourth airflow path 24. The air flowing into the fourth airflow path 24 passes through the first heat exchanger 3, and thereby is heated by condensation heat of the refrigerant and increases in temperature (point b in FIG. 8). The air passing through the first heat exchanger 3 further passes through the humidifier 8, and thereby increases in humidity and decreases in temperature (point c in FIG. 8). The air passing through the humidifier 8 passes through the second heat exchanger 5, and thereby is cooled by heat absorption by the refrigerant (heat absorption when the refrigerant changes from supercooled liquid to saturated liquid) and decreases in temperature, and is supplied into the room as blown out air (room supply air) SA (point SA in FIG. 8). Meanwhile, the indoor air RA flowing out of the total heat exchanger 20 flows into the third airflow path 23 and is exhausted as exhaust air EA.

As described in the first embodiment, the controller 50 controls the amount of condensation heat in the first heat exchanger 3 by controlling the amount of air blown by the indoor blower fan 15 and the capacity of the compressor 2. The controller 50 also controls the amount of humidification in the humidifier 8 by controlling the amount of water supplied to the humidifier 8, depending on a humidification load in the room. The controller 50 also controls the amount of decompression by the first decompressor 4 so that the temperature ET1 (FIG. 2) of the refrigerant in the second heat exchanger 5 is higher than the dew-point temperature (Td in FIG. 3) of the air that has passed through the humidifier 8.

The air conditioning system 102 of the third embodiment can perform not only humidifying operations but also dehumidifying operations by switching of the four-way valve 9 described in the second embodiment. The dehumidifying operation in this case will be described.

The flow of the refrigerant during the dehumidifying operation is as described in the second embodiment, so the airflow during the dehumidifying operation will be described. With rotation of the indoor blower fan 15 of the outside air processing unit 1A, the outdoor air OA is sucked into the first airflow path 21 and flows into the total heat exchanger 20. Also, with rotation of the exhaust fan 14, the indoor air RA is sucked into the second airflow path 22 and flows into the total heat exchanger 20. In the total heat exchanger 20, heat is exchanged between the outdoor air OA and the indoor air RA. For example, in the case of the dehumidifying operation in summer, since the temperature of the indoor air RA is lower, the temperature of the outdoor air OA decreases.

The outdoor air OA flowing out of the total heat exchanger 20 flows into the fourth airflow path 24, passes through the first heat exchanger 3, and transfers evaporation heat to the refrigerant, thereby decreasing in temperature. With the decrease in temperature of the air, moisture contained in the air condenses and is removed, so that the humidity of the air also decreases. The air passing through the first heat exchanger 3 further passes through the humidifier 8, but since supply of water to the humidifier 8 is stopped during the dehumidifying operation, the temperature and humidity of the air do not change. The air passing through the humidifier 8 is heated by heat released by the refrigerant (heat released when the degree of supercooling of the refrigerant increases) when passing through the second heat exchanger 5, and then is supplied into the room as blown out air SA. Meanwhile, the indoor air RA flowing out of the total heat exchanger 20 flows into the third airflow path 23 and is exhausted as exhaust air EA.

As described in the second embodiment, the controller 50 controls the evaporation temperature in the first heat exchanger 3 by controlling the amount of air blown by the indoor blower fan 15, the amount of decompression by the first decompressor 4, and the capacity of the compressor 2. Thus, the amount of dehumidification can be adjusted depending on a dehumidification load in the room. The controller 50 also controls the amount of decompression by the second decompressor 6 on the basis of a target temperature of the blown out air, thereby controlling the temperature SC2 of the supercooled refrigerant in the second heat exchanger 5. Thereby, dehumidified air at an appropriate temperature is supplied into the room.

<Advantages>

As described above, in addition to the advantages described in the first and second embodiments, the air conditioning system 102 of the third embodiment can achieve the following advantages by utilizing a total heat recovery effect of the total heat exchanger 20.

During the humidifying operation in winter, since the humidity of the indoor air RA increases the humidity of the outdoor air OA in the total heat exchanger 20, the amount of humidification by the humidifier 8 can be reduced. Also, the amount of heating by the first heat exchanger (condenser) 3 can be reduced, which allows an operation in which the condensation temperature in the first heat exchanger 3 is set to low, which can reduce energy consumption.

Also, during the dehumidifying operation in summer, since the heat exchange in the total heat exchanger 20 decreases the temperature of the outdoor air OA, the amount of heat absorption by the first heat exchanger (evaporator) 3 can be reduced. This allows an operation in which the evaporation temperature in the first heat exchanger 3 is set to high, which can reduce energy consumption.

Although in the above description, the air conditioning system 102 includes the four-way valve 9 and is configured so that it can perform both the humidifying operation and the dehumidifying operation by switching the flow of the refrigerant, the air conditioning system 102 may be configured to perform only the humidifying operation without including the four-way valve 9, as in the first embodiment.

Fourth Embodiment

A fourth embodiment of the present invention will now be described. In the fourth embodiment, an auxiliary heat exchanger 18 is added to the outside air processing unit 1A of the air conditioning system 102 of the third embodiment.
<Configuration>

Figure 9:
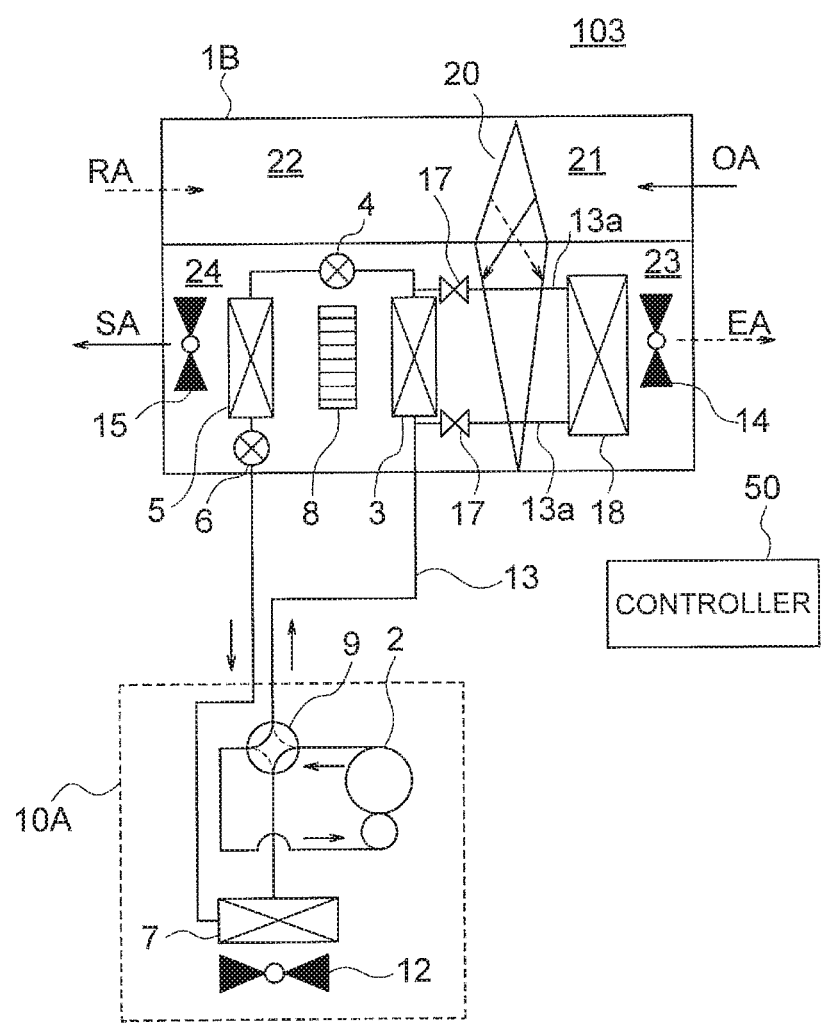
FIG. 9 is a diagram illustrating a configuration of an air conditioning system according to a fourth embodiment of the present invention.

FIG. 9 is a diagram illustrating a configuration of an air conditioning system 103 of the fourth embodiment. In an outside air processing unit 1B of the air conditioning system 103 of the fourth embodiment, the auxiliary heat exchanger 18 is provided in the third airflow path 23. On the other hand, the first heat exchanger 3, first decompressor 4, second heat exchanger 5, and second decompressor 6, which constitute the refrigerant circuit, and the humidifier 8 are provided in the fourth airflow path 24, as in the third embodiment.

The auxiliary heat exchanger 18 is connected to the refrigerant circuit (the compressor 2, first heat exchanger 3, first decompressor 4, second heat exchanger 5, second decompressor 6, and outdoor heat exchanger 7) in parallel with the first heat exchanger 3.

Specifically, branch piping 13a is connected to an inlet side and an outlet side of the first heat exchanger 3 in the refrigerant piping 13 of the refrigerant circuit, and the auxiliary heat exchanger 18 is connected to the branch piping 13a. Further, flow control valves 17 for controlling the amount of refrigerant flowing through the auxiliary heat exchanger 18 are provided on an inlet side and an outlet side of the auxiliary heat exchanger 18 in the branch piping 13a.

When increasing the amount of cooling of air in the second heat exchanger 5, the controller 50 of the air conditioning system 103 opens the flow control valves 17 so that the refrigerant discharged from the compressor 2 flows into both the first heat exchanger 3 and auxiliary heat exchanger 18.
<Operation>

The flow of the refrigerant during the humidifying operation is as follows. The high-temperature and high-pressure gas refrigerant (point A in FIG. 2) discharged from the compressor 2 flows into the first heat exchanger 3 of the outside air processing unit 1B. The first heat exchanger 3 operates as a condenser, and the refrigerant exchanges heat with the air in the fourth airflow path 24, thereby releasing heat and condensing into liquid single-phase refrigerant (point B in FIG. 2).

When the controller 50 opens the flow control valves 17, the refrigerant also flows into the auxiliary heat exchanger 18, which operates as a condenser. In the auxiliary heat exchanger 18, the refrigerant exchanges heat with the air in the third airflow path 23, thereby releasing heat and condensing into liquid single-phase refrigerant.

The refrigerant condensed in the first heat exchanger 3 and auxiliary heat exchanger 18 flows into the first decompressor 4 and is decompressed into low-temperature and low-pressure liquid refrigerant (point C in FIG. 2). The refrigerant decompressed by the first decompressor 4 flows into the second heat exchanger 5. In the second heat exchanger 5, the refrigerant exchanges heat with the air in the fourth airflow path 24, thereby absorbing heat and entering a saturated liquid state (point D in FIG. 2).

The refrigerant in the saturated liquid state flowing out of the second heat exchanger 5 flows into the second decompressor 6, and is decompressed into low-temperature and low-pressure two-phase refrigerant (point E in FIG. 2). The two-phase refrigerant flowing out of the second decompressor 6 flows into the outdoor heat exchanger (evaporator) 7, and exchanges heat with air outside the room, thereby evaporating (point F in FIG. 2). The refrigerant evaporated in the outdoor heat exchanger 7 returns to the compressor 2 through the four-way valve 9.

The airflow is as follows. With rotation of the indoor blower fan 15, the outdoor air OA is sucked into the first airflow path 21 and flows into the total heat exchanger 20. Also, with rotation of the exhaust fan 14, the indoor air RA is sucked into the second airflow path 22 and flows into the total heat exchanger 20. In the total heat exchanger 20, heat is exchanged between the outdoor air OA and the indoor air RA.

The outdoor air OA flowing out of the total heat exchanger 20 (point a in FIG. 8) flows into the fourth airflow path 24, and passes through the first heat exchanger (condenser) 3, thereby increasing in temperature (point b in FIG. 8). The air passing through the first heat exchanger 3 further passes through the humidifier 8, thereby increasing in humidity and decreasing in temperature (point c in FIG. 8). The air passing through the humidifier 8 passes through the second heat exchanger 5, thereby being cooled by heat absorption by the refrigerant (heat absorption when the refrigerant changes from supercooled liquid to saturated liquid) and decreasing in temperature. The air is then supplied into the room as blown out air SA (point SA in FIG. 8). Meanwhile, the indoor air RA passing through the total heat exchanger 20 flows into the third airflow path 23, passes through the auxiliary heat exchanger 18, in which the air is heated, and is then exhausted outside the room as exhaust air EA.

The controller 50 controls the amount of condensation heat in the first heat exchanger 3 by controlling the amount of air blown by the indoor blower fan 15, the capacity of the compressor 2, and the degrees of opening of the flow control valves 17. The controller 50 also controls the amount of humidification in the humidifier 8 by controlling the amount of water supplied to the humidifier 8. The controller 50 also controls the amount of decompression by the first decompressor 4 so that the temperature ET1 (FIG. 2) of the refrigerant at the second heat exchanger 5 is higher than the dew-point temperature (Td in FIG. 3) of the air that has passed through the humidifier 8.

In the fourth embodiment, a part of the refrigerant discharged from the compressor 2 flows into the auxiliary heat exchanger 18. This auxiliary heat exchanger 18 is located so that it does not affect the blown out air SA. Thus, by increasing the capacity of the compressor 2, it is possible to increase only the amount of heat released by the refrigerant (i.e., the amount of cooling of the outdoor air OA) in the second heat exchanger 5 without increasing the amount of condensation heat (i.e., the amount of heating of the outdoor air OA) in the first heat exchanger 3. This makes it possible to control the temperature of the blown out air SA in a wide range.

In the fourth embodiment, by switching of the four-way valve 9, it is possible to perform not only a humidifying operation but also a dehumidifying operation. The dehumidifying operation in this case will be described. The flow control valves 17 are closed during the dehumidifying operation. Since the flow control valves 17 are closed, the flow of the refrigerant during the dehumidifying operation is the same as the flow of the refrigerant during the dehumidifying operation in the third embodiment.

The airflow is as follows. With rotation of the indoor blower fan 15, outdoor air OA is sucked into the first airflow path 21 and flows into the total heat exchanger 20. Also, with rotation of the exhaust fan 14, indoor air RA is sucked into the second airflow path 22 and flows into the total heat exchanger 20. In the total heat exchanger 20, heat is exchanged between the outdoor air OA and the indoor air RA.

The outdoor air OA flowing out of the total heat exchanger 20 flows into the fourth airflow path 24, and passes through the first heat exchanger (evaporator) 3, in which the air transfers evaporation heat to the refrigerant and decreases in temperature. With the decrease in temperature of the air, moisture contained in the air condenses and is removed, so that the humidity of the air also decreases. The air passing through the first heat exchanger 3 further passes through the humidifier 8, but since supply of water to the humidifier 8 is stopped, the temperature and humidity do not change. The air passing through the humidifier 8 is heated by heat released by the refrigerant (heat released when the degree of supercooling of the refrigerant increases) when passing through the second heat exchanger 5, and is supplied into the room as blown out air SA. Meanwhile, the indoor air RA flowing out of the total heat exchanger 20 flows into the third airflow path 23 and is exhausted as exhaust air EA.

The controller 50 controls the evaporation temperature in the first heat exchanger 3 by controlling the amount of air blown by the indoor blower fan 15, the amount of decompression by the first decompressor 4, and the capacity of the compressor 2. Thereby, the amount of dehumidification can be adjusted depending on a dehumidification load in the room. In addition, the controller 50 controls the amount of decompression by the second decompressor 6 on the basis of a target temperature of the blown out air, thereby controlling the temperature SC2 of the supercooled refrigerant in the second heat exchanger 5. Thereby, dehumidified air at an appropriate temperature is supplied into the room.

<Advantages>

In the air conditioning system 103 of the fourth embodiment of the present invention, the auxiliary heat exchanger 18 is provided in the refrigerant circuit in parallel with the first heat exchanger 3, and the auxiliary heat exchanger 18 is disposed outside the fourth airflow path 24. This makes it possible to increase the flow of the refrigerant flowing through the second heat exchanger 5 without increasing the flow of the refrigerant flowing through the first heat exchanger 3, which contributes to heating of the air, by increasing the flow of the refrigerant, during the humidifying operation. This makes it possible to further decrease the temperature of the blown out air SA. Thus, it becomes possible to control the temperature of the blown out air SA in a wider range.

Although in the above description, the air conditioning system 103 includes the four-way valve 9 and is configured so that it can perform both the humidifying operation and dehumidifying operation by switching the flow of the refrigerant, the air conditioning system 103 may be configured to perform only the humidifying operation without including the four-way valve 9, as in the first embodiment.

Fifth Embodiment

<Configuration>

Figure 10:
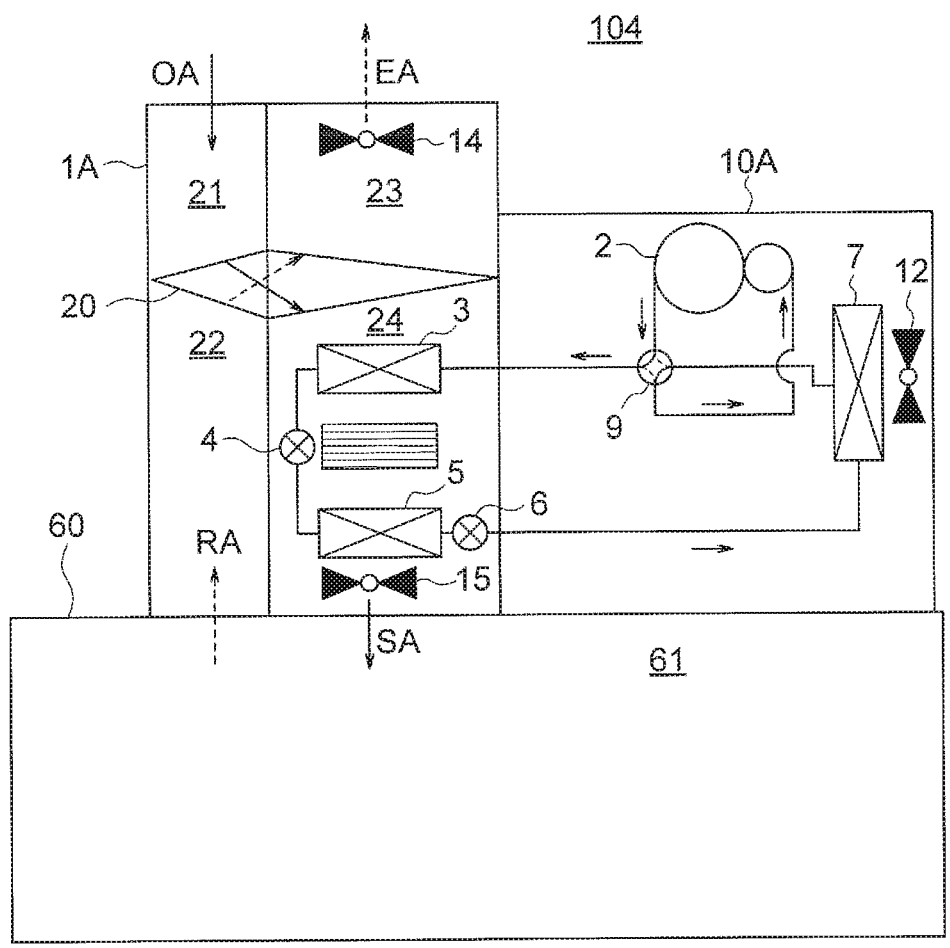
FIG. 10 is a diagram illustrating a configuration of an air conditioning system according to a fifth embodiment of the present invention.

A fifth embodiment of the present invention will now be described. FIG. 10 is a diagram illustrating a configuration of an air conditioning system 104 of the fifth embodiment. In the air conditioning system 104 of the fifth embodiment, the outside air processing unit 1A and outdoor unit 10A are integrated, and the air conditioning system 104 is mounted on a roof of a building 60, for example.

The air conditioning system 104 includes the outside air processing unit 1A and outdoor unit 10A that have been described in the third embodiment. However, the outside air processing unit 1 (FIG. 1) described in the first or second embodiment, or the outside air processing unit 1B (FIG. 9) described in the fourth embodiment may be used instead of the outside air processing unit 1A. Also, the outdoor unit 10 (FIG. 1) described in the first embodiment may be used instead of the outdoor unit 10A.

The air conditioning system 104 is placed, for example, on the roof of the building 60 so that an inlet of the second airflow path 22 and an outlet of the fourth airflow path 24 communicate with a room 61 that is a space in the building 60.

Placing the air conditioning system 104 on the roof of the building 60 allows the room 61, the grounds of the building 60, or other spaces to be effectively utilized. However, the air conditioning system 104 can be placed not only on the roof but also on a side of the building 60, for example.

<Operation>

The operation of the air conditioning system 104 of the fifth embodiment is as described in the first to fourth embodiments.

<Advantages>

As described above, in the fifth embodiment, in addition to the advantages of the first to fourth embodiments, since the air conditioning system 104 is integrated, it is possible to place the air conditioning system 104 in one place, thereby improving maintenance. Further, when the air conditioning system 104 is placed, for example, on a roof, since the units of the air conditioning system 104 do not occupy the room 61 or the grounds of the building, space can be effectively utilized.

Modifications

Figure 11:
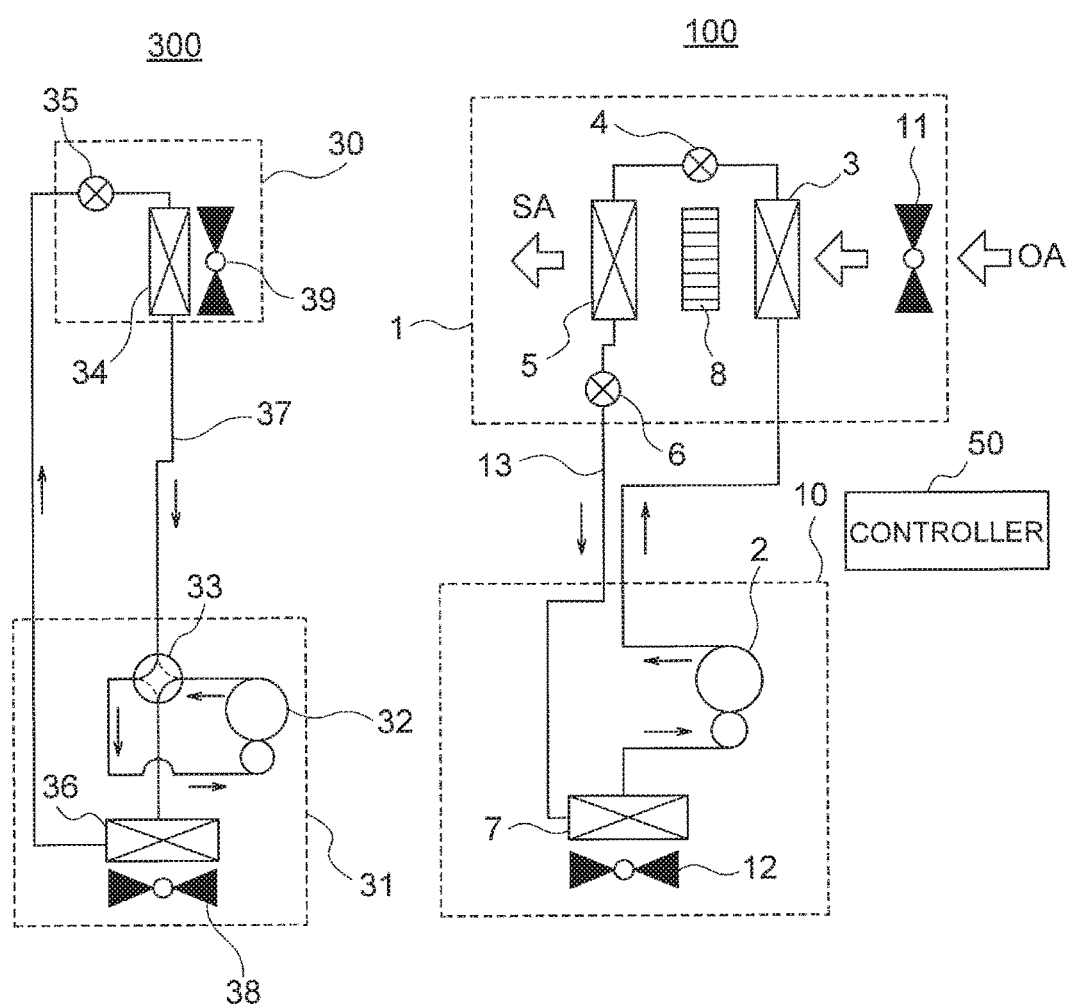
FIG. 11 is a diagram illustrating a configuration of an air conditioning system according to a modification of the embodiments of the present invention.
Figure 12:
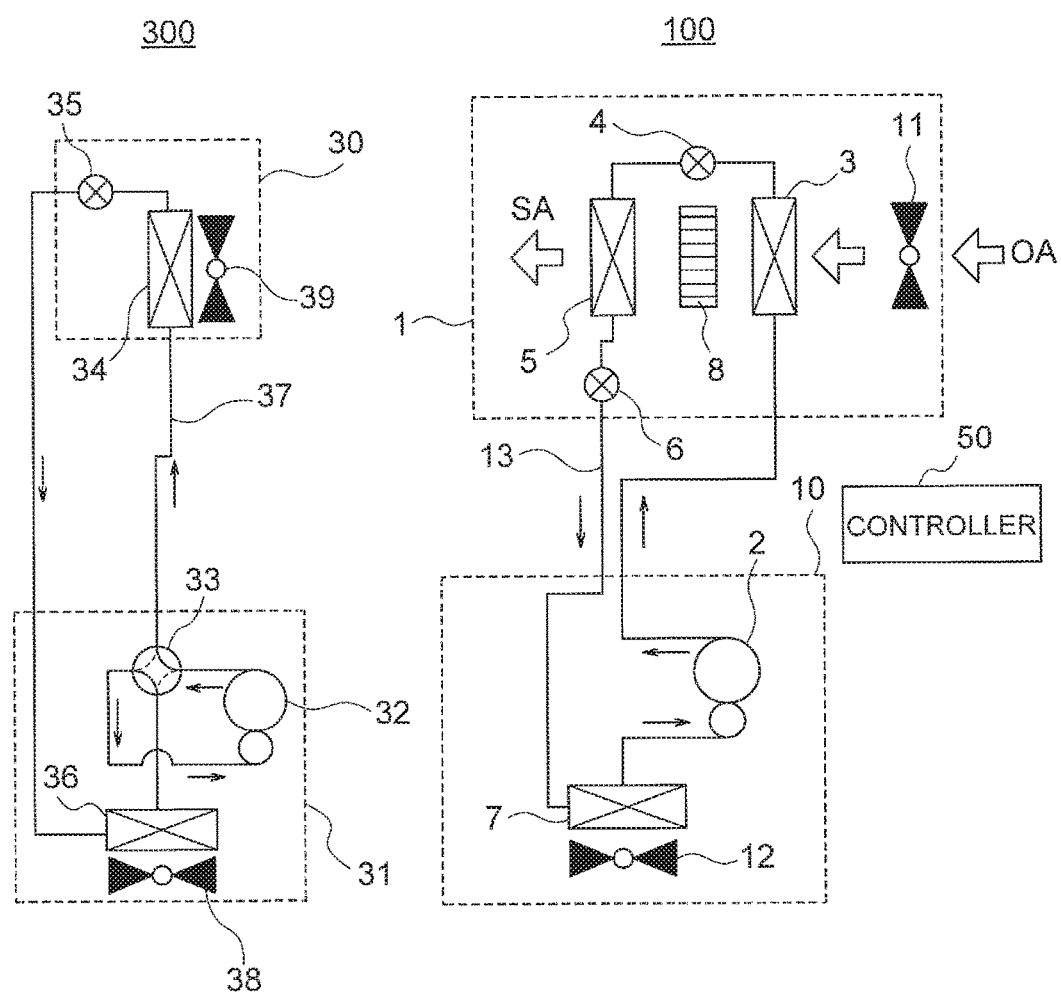
FIG. 12 is a diagram illustrating the configuration of the air conditioning system according to the modification of the embodiments of the present invention.

All the air conditioning systems 100 to 104 described in the first to fifth embodiments can operate in conjunction with a room air conditioner (also referred to as an internal conditioner) that conditions air in a room. FIG. 11 is a diagram illustrating an example in which the air conditioning system 100 (outside air processing unit 1 and outdoor unit 10) described in the first embodiment operates in conjunction with a room air conditioner 300, which is performing a cooling operation. FIG. 12 is a diagram illustrating an example in which the air conditioning system 100 described in the first embodiment operates in conjunction with the room air conditioner 300, which is performing a heating operation.

The room air conditioner 300 includes an indoor unit 30 and an outdoor unit 31. The indoor unit 30 and outdoor unit 31 are connected to each other through refrigerant piping 37. The indoor unit 30, outdoor unit 31, and refrigerant piping 37 constitute a refrigerant circuit.

The indoor unit 30 includes an indoor heat exchanger 34, a decompressor 35, and an indoor blower fan 39. The outdoor unit 31 includes a compressor 32, a four-way valve (flow path switching valve) 33, an outdoor heat exchanger 36, and an outdoor blower fan 38.

The compressor 32 sucks and compresses refrigerant into high-temperature and high pressure gas refrigerant, and discharges it. The compressor 32 is equipped with, for example, an inverter, and the capacity of the compressor 32 can be controlled by controlling its operational frequency.

The four-way valve 33 switches the flow path so that the refrigerant discharged from the compressor 32 flows into the outdoor heat exchanger 36 during the cooling operation (FIG. 11) and into the indoor heat exchanger 34 during the heating operation (FIG. 12).

The outdoor heat exchanger 36 exchanges heat between the refrigerant and air outside the room. The outdoor heat exchanger 36 operates as a condenser during the cooling operation, and functions as an evaporator during the heating operation. The outdoor blower fan 38 is disposed to face the outdoor heat exchanger 36.

The decompressor 35 decompresses the refrigerant flowing through the refrigerant piping 37. The indoor heat exchanger 34 exchanges heat between the refrigerant and air in the room. The indoor heat exchanger 34 operates as an evaporator during the cooling operation, and functions as a condenser during the heating operation. The indoor blower fan 39 is disposed to face the indoor heat exchanger 34.

The capacity of the compressor 32, switching of the four-way valve 33, the amount of decompression by the decompressor 35, the amount of air blown by the outdoor blower fan 38, and the amount of air blown by the indoor blower fan 39 are desirably controlled by the controller 50 of the air conditioning system 100, but may be controlled by another controller.

The air conditioning system 100 is configured to perform the humidifying operation as described in the first embodiment. However, it is also possible to provide the four-way valve 9 and switch between the humidifying operation and the dehumidifying operation as described in the second embodiment.

In the cooling operation, illustrated in FIG. 11, the room air conditioner 300 operates as follows. The high-temperature and high-pressure gaseous refrigerant discharged from the compressor 32 flows into the outdoor heat exchanger 36 through the four-way valve 33. The outdoor heat exchanger 36 operates as a condenser, and the refrigerant condenses into liquid refrigerant. The refrigerant condensed in the outdoor heat exchanger 36 flows into the decompressor 35 and is decompressed into low-temperature and low-pressure liquid refrigerant. The refrigerant decompressed by the decompressor 35 flows into the indoor heat exchanger 34. The indoor heat exchanger 34 operates as an evaporator, and the refrigerant absorbs heat and evaporates. The refrigerant evaporated in the indoor heat exchanger 34 returns to the compressor 32.

In this case, the controller 50 detects a cooling load or a cooling capacity of the room air conditioner 300, and controls the temperature of the blown out air (room supply air) SA from the outside air processing unit 1 on the basis of the detected cooling load or cooling capacity. The cooling load or cooling capacity of the room air conditioner 300 is detected on the basis of, for example, a rotational frequency of the compressor 32. For example, providing a sensor for measuring the rotational frequency of the compressor 32 of the room air conditioner 300 and transmitting its detection value to the controller 50 by means of a communication device allows the controller 50 to detect the cooling load or cooling capacity of the room air conditioner 300.

When the detected cooling load or cooling capacity is higher than a reference value, control is performed so that the temperature of the blown out air from the outside air processing unit 1 decreases. Also, when the detected cooling load or cooling capacity is lower than a reference value, control is performed so that the temperature of the blown out air from the outside air processing unit 1 increases. Thereby, it is possible to reduce an increase in the cooling load of the room air conditioner 300 and reduce energy consumption.

In the heating operation, illustrated in FIG. 12, the room air conditioner 300 operates as follows. The high-temperature and high-pressure gaseous refrigerant discharged from the compressor 32 flows into the indoor heat exchanger 34 through the four-way valve 33. The indoor heat exchanger 34 operates as a condenser, and the refrigerant condenses into liquid refrigerant. The refrigerant condensed in the indoor heat exchanger 34 flows into the decompressor 35 and is decompressed into low-temperature and low-pressure liquid refrigerant. The refrigerant decompressed by the decompressor 35 flows into the outdoor heat exchanger 36. The outdoor heat exchanger 36 operates as an evaporator, and the refrigerant absorbs heat and evaporates. The refrigerant evaporated in the outdoor heat exchanger 36 returns to the compressor 32.

In this case, the controller 50 detects a heating load or a heating capacity of the room air conditioner 300, and controls the temperature of the blown out air from the outside air processing unit 1 on the basis of the detected heating load or heating capacity. Specifically, when the detected heating load or heating capacity is higher than a reference value, control is performed so that the temperature of the blown out air from the outside air processing unit 1 increases; when the detected heating load or heating capacity is lower than a reference value, control is performed so that the temperature of the blown out air from the outside air processing unit 1 decreases. Thereby, the air conditioning system 100 can exert a heating capacity together with the room air conditioner 300 and satisfy the amount of humidification. Thus, energy consumption can be reduced.

Figure 13:
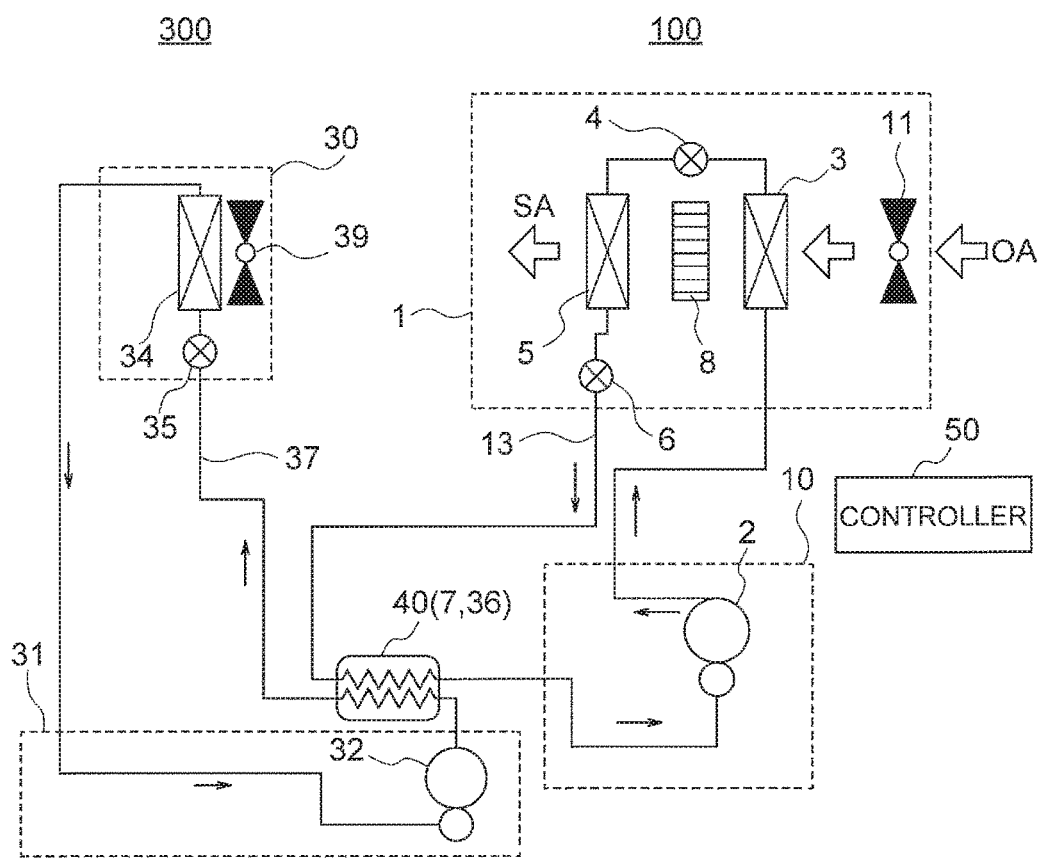
FIG. 13 is a diagram illustrating a configuration of an air conditioning system according to another modification of the embodiments of the present invention.

Further, as illustrated in FIG. 13, it is possible to connect the outdoor heat exchanger (condenser) 36 of the room air conditioner 300 that performs the cooling operation and the outdoor heat exchanger (evaporator) 7 of the air conditioning system 100 that performs the humidifying operation, by means of a refrigerant-refrigerant heat exchanger 40. With this configuration, the condensation heat of the refrigerant generated in the outdoor heat exchanger (condenser) 36 of the room air conditioner 300 can be consumed by evaporation of the refrigerant in the outdoor heat exchanger (evaporator) 7 of the air conditioning system 100. Such effective use of the exhaust heat makes it possible to further reduce energy consumption.

While the embodiments of the present invention have been described above, the configuration, including the piping connection, of the refrigerant circuit, and each of the components, such as the compressor, heat exchangers, and decompressors, of the refrigerant circuit are not limited to the specific examples described in the above embodiments, and may be appropriately changed. For example, the refrigerant circuit may include a fluid reservoir.

The invention claimed is:

1. An air conditioning system comprising:
a compressor to compress refrigerant;
a first heat exchanger to condense the refrigerant compressed by the compressor into a supercooled liquid state;
a first decompressor to decompress the refrigerant condensed into the supercooled liquid state in the first heat exchanger;
a second heat exchanger to cause the refrigerant decompressed by the first decompressor to absorb heat;
a second decompressor to decompress the refrigerant that has absorbed heat in the second heat exchanger;
a third heat exchanger to evaporate the refrigerant decompressed by the second decompressor; and
a blower fan to take in air from outside a room and blow the air to the first heat exchanger,
wherein the second heat exchanger is disposed downstream of the first heat exchanger in a blowing direction of the blower fan,
wherein a humidifier is disposed between the first heat exchanger and the second heat exchanger in the blowing direction of the blower fan, and
wherein the air blown from the blower fan is heated by the first heat exchanger, humidified by the humidifier, cooled by the second heat exchanger, and supplied into the room.

2. The air conditioning system of claim 1, wherein the refrigerant changes from the supercooled liquid state to a saturated liquid state in the second heat exchanger.

3. The air conditioning system of claim 2, wherein a temperature at which the refrigerant changes from the supercooled liquid state to the saturated liquid state in the second heat exchanger is higher than a dew-point temperature of the air that has passed through the humidifier.

4. The air conditioning system of claim 2, wherein the second decompressor decompresses the refrigerant in the saturated liquid state into two-phase refrigerant.

5. The air conditioning system of claim 1, further comprising a switching valve to switch a circulating direction of the refrigerant so that the refrigerant flows through the compressor, the third heat exchanger, the second decompressor, the second heat exchanger, the first decompressor, and the first heat exchanger in this order,
wherein a dehumidifying operation is performed by switching the circulating direction of the refrigerant by means of the switching valve and stopping operation of the humidifier.

6. The air conditioning system of claim 1, further comprising a controller,
wherein the controller controls an amount of condensation heat in the first heat exchanger by controlling at least one of an operational frequency of the compressor and an amount of air blown by the blower fan.

7. The air conditioning system of claim 6, wherein the controller controls a temperature of the refrigerant in the second heat exchanger by controlling an amount of decompression in the first decompressor.

8. The air conditioning system of claim 1, further comprising:
a first airflow path to introduce outdoor air;
a second airflow path to introduce indoor air;
a total heat exchanger to exchange heat between the outdoor air and the indoor air flowing into the total heat exchanger through the first airflow path and the second airflow path;
a third airflow path to exhaust the indoor air flowing out of the total heat exchanger outside the room; and
a fourth airflow path to supply the outdoor air flowing out of the total heat exchanger into the room,
wherein the first heat exchanger, the second heat exchanger, and the humidifier are provided in the fourth airflow path.

9. The air conditioning system of claim 8, further comprising an auxiliary heat exchanger provided in parallel with the first heat exchanger,
wherein the auxiliary heat exchanger is disposed in the third airflow path.

10. The air conditioning system of claim 1, wherein the air conditioning system operates in conjunction with a room air conditioner to control a temperature of indoor air,
wherein during a cooling operation of the room air conditioner, the air conditioning system detects a cooling load or a cooling capacity of the room air conditioner,
wherein when the detected cooling load or cooling capacity is greater than a reference value, the air conditioning system decreases a temperature of the air supplied into the room, and
wherein when the detected cooling load or cooling capacity is less than the reference value, the air conditioning system increases the temperature of the air supplied into the room.

11. The air conditioning system of claim 1, wherein the air conditioning system operates in conjunction with a room air conditioner to control a temperature of indoor air,
wherein during a heating operation of the room air conditioner, the air conditioning system detects a heating load or a heating capacity of the room air conditioner,
wherein when the detected heating load or heating capacity is greater than a reference value, the air conditioning system increases a temperature of the air supplied into the room, and
wherein when the detected heating load or heating capacity is less than the reference value, the air conditioning system decreases the temperature of the air supplied into the room.

12. The air conditioning system of claim 1, wherein the air conditioning system operates in conjunction with a room air conditioner to control a temperature of indoor air, and
wherein the air conditioning system utilizes exhaust heat generated by the room air conditioner as a heat source.

13. The air conditioning system of claim 1, wherein the first heat exchanger, the first decompressor, the second heat exchanger, and the second decompressor constitute an outside air processing unit, and
wherein the compressor and the third heat exchanger constitute an outdoor unit.

14. The air conditioning system of claim 13, wherein the outside air processing unit and the outdoor unit are integrated.

* * * * *